United States Patent [19]

Buding et al.

[11] Patent Number: 4,853,441

[45] Date of Patent: Aug. 1, 1989

[54] PROCESS FOR HYDROGENATING NITRILE GROUP-CONTAINING UNSATURATED POLYMERS

[75] Inventors: Hartmuth Buding, Dormagen; Rudolf Casper, Leverkusen, both of Fed. Rep. of Germany

[73] Assignee: Bayer Aktiengesellschaft, Leverkusen, Fed. Rep. of Germany

[21] Appl. No.: 122,921

[22] Filed: Nov. 19, 1987

Related U.S. Application Data

[63] Continuation of Ser. No. 848,497, Apr. 7, 1986, abandoned.

[30] Foreign Application Priority Data

Apr. 20, 1985 [DE] Fed. Rep. of Germany ....... 3514403

[51] Int. Cl.$^4$ ............................................... C08F 8/04
[52] U.S. Cl. .................................. 525/339; 525/329.3
[58] Field of Search ......................................... 525/339

[56] References Cited

U.S. PATENT DOCUMENTS 4,452,951  6/1984  Kubo et al. .................... 525/339

FOREIGN PATENT DOCUMENTS 3227650  3/1983  Fed. Rep. of Germany .

OTHER PUBLICATIONS

Author: Rachapudy et al., Title: "Properties of Amorphous and Crystallizable Hydrocarbon Polymers. III. Studies of Hydrogenation of Polybutadiene" from *Journal of Polymer Science: Polymer Physics Edition*, vol. 17, pp. 1211–1222, dtd 1979.

Author: Schulz et al., Title: "The Heterogeneous Hydrogenation of Hydrogenation of Polyisoprene", from *Chemical Abstracts*, vol. 101, p. 76, dtd 1984.

*Primary Examiner*—Joseph L. Schofer
*Assistant Examiner*—Bernard Lipman
*Attorney, Agent, or Firm*—Connolly and Hutz

[57] ABSTRACT

An advantageous process for the heterogeneous catalytic hydrogenation of nitrile group-containing unsaturated polymers retaining nitrile groups, is characterised in that palladium supported on alkaline earth metal carbonates is used as hydrogenation catalyst.

7 Claims, No Drawings

PROCESS FOR HYDROGENATING NITRILE GROUP-CONTAINING UNSATURATED POLYMERS

This is a continuation of application Ser. No. 848,497 filed Apr. 7, 1986, now abandoned.

This invention relates to a process for hydrogenating nitrile group-containing unsaturated polymers without affecting the nitrile groups.

In U.S. Pat. No. 3,700,637, the hydrogenation of acrylonitrile/butadiene copolymers using homogeneous catalysts is described; the hydrogenation using heterogeneous catalysts, for example, palladium or carbon, diatomaceous earth, aluminium oxide, silicate or asbestos, is mentioned as a possibility.

It is known from DE-OS No. 3,046,008 to hydrogenate acrylonitrile/butadiene copolymers using palladium and at least one further metal, the metals being precipitated on a porous, pulverulent or granular carrier, for example diatomaceous earth or activated carbon.

In DE-OS No. 3,227,650, the hydrogenation of acrylonitrile/butadiene copolymers using hydrogenation catalysts based on silicon dioxide having selected pore diameters is described.

The proposed carrier materials for the heterogeneous hydrogenation catalysts for acrylonitrile/butadiene copolymers have a porous structure and thus suffer from the disadvantage of low mechanical strength, that is, they cannot be successfully used several times since, owing to the mechanical stess a fine grain portion occurs, which either renders impure the hydrogenation product or renders the working-up substantially more difficult.

It has now surprisingly been found that, with particular non-porous carrier materials, the hydrogenation of acrylonitrile/butadiene copolymers succeeds with at least an equally good degree of hydrogenation. The hydrogenation catalyst used according to the present invention is characterised by high mechanical stability and may thus be easily recovered and often re-used.

The present invention thus provides a process for the heterogeneous catalytic hydrogenation of nitrile group-containing unsaturated polymers retaining nitrile groups, characterised in that palladium supported on alkaline earth metal carbonates is used as hydrogenation catalyst.

The catalyst is produced according to conventional methods from alkaline earth metal carbonate, in particular from particularly pure alkaline earth metal carbonate, and palladium, for example by suspending the alkaline earth metal carbonate in water, adding a suitable palladium salt solution and precipitating the palladium on the carrier. The catalyst may be used in oxidic or reduced form for the hydrogenation according to the present invention. The oxidic form is the preferred catalyst form owing to the good storability and activity. The reduction of the oxidic form first takes place immediately before or during the actual hydrogenation of the substrate.

The effect of the catalyst may be strengthened or weakened with further metals or compounds. The specific surface area (BET) of the catalyst is less than 100 m$^2$/g, preferably less than 50 m$^2$/g, more preferably less than 30 m$^2$/g.

The quantity of the palladium precipitated on the alkaline earth metal carbonate is from 0.01 to 20%, by weight, preferably from 0.1 to 15%, by weight. The amount of catalyst (calculated as palladium), based on polymer, is from 5 to 20,000 ppm, preferably from 50 to 15,000 ppm. The concentration of the polymer solution is from 1 to 50%, by weight, preferably from 1 to 40%, by weight.

Calcium carbonate is particularly suitable as the alkaline earth metal carbonate. Palladium chloride is particularly suitable as palladium salt. Those liquid organic compounds or mixtures thereof are used as solvent for reduction and/or hydrogenation which are inert under the reaction conditions of the reduction and/or hydrogenation and do not disadvantageously influence the catalyst, particularly ketones, such as acetone, methylethyl ketone, methylisopropyl ketone, diisopropyl ketone, 2- or 3- pentanone, cyclohexanone, preferably acetone and metylethyl ketone, ethers, such as tetrahydrofuran, dioxan, anisole or ethylene glycol monomethyl ether, preferably tetrahydrofuran and anisole, and aromatic hydrocarbons, such as benzene, toluene or xylene.

Both the unsaturated and the partially or completely hydrogenated polymers should be soluble in the solvent used.

The hydrogenation process is particularly suitable for hydrogenating copolymers consisting of from 85 to 50%, by weight, preferably from 82 to 55%, by weight, of at least one conjugated diene, from 15 to 50%, by weight, preferably from 18 to 45%, by weight, of at least one unsaturated nitrile and from 0 to 10%, by weight, preferably from 0 to 8%, by weight, of at least one further monomer which is copolymerisable with the conjugated dienes and unsaturated nitriles.

Conjugated dienes which may be used are, for example, butadiene-1,3, 2-methyl butadiene-1,3, 2,3-dimethyl butadiene-1,3 and pentadiene-1,3, unsaturated nitriles which may be sued are acrylonitrile and methacrylonitrile.

Further monomers which may be used are vinyl aromatic substances, such as styrene, o-, m- or p-, methylstyrene, vinyl naphthalene and vinyl pyridine, $\alpha$, $\beta$-unsaturated monocarboxylic acids having from 3 to 5 carbon atoms, such as acrylic acid, methacrylic acid and crotonic acid, as well as $\alpha$, $\beta$-unsaturated dicarboxylic acids having 4 or 5 carbon atoms, such as maleic, fumaric, citraconic and itaconic acid, moreover N-methylol acrylic amide and vinyl akyl ether having from 1 to 4 carbon atoms in the alkyl moiety.

A binary copolymer of butadiene and acrylonitrile is preferably hydrogeanted.

The molecular weight of the polymers is not critical and is from 500 to 500,000 g/mol, prefreably from 1000 to 200,000 g/mol, more preferably from 30,000 to 150,000 g/mol, (number average, determined by gel permeation chromatography).

The nitrile group-containing polymer may, for example, be linear, branched, or stellate and be constructed as desired in the monomer sequence, for example, statistically, alernating or in a block-type manner and may be synthesized according to various production methods, for example emulsion or solution polymerisation.

The degrees of hydrogenation (percentage of the hydrogenated CC double bonds based on the total number of original CC double bonds present in the polymer) may be up to 100%. The hydrogenation may, however, be terminated beforehand if necessary. Polymers having degrees of hydrogenation of about 80%, particularly about 90%, preferably above 95%, particularly preferably about 99%, are particularly obtained according to the present process. The degree of hydrogenation is NMR- and IR-spectroscopically determined. The hydrogenation is carried out at from 0° to 200° C., preferably from 5° to 150° C., particularly from 10° to 100° C., and under a hydrogen pressure of from 1 to 350 bar, preferably from 5 to 250 bar.

After hydrogenation, the catalyst may be separated from the solution by conventional methods, for example filtering or centrifuging. The isolation of the polymers from the solution takes place according to known methods, for example by evaporation, optionally under vacuum, by purging with steam or by adding a non-solvent. In order to remove the residual solvent or water, drying may optionally follow.

The hydrogenated polymers obtained according to the present invention may be hardened in conventional manner by a peroxide, radiation or sulphur vulcanisation. Owing to the excellent weather, ozone, oil and hot air resistance thereof, as well as resistance to a cold climate, these polymers may be used for high quality rubber articles, such as seals, flexible tubes, membranes, cable insulations and cable sheaths.

EXAMPLE 1

A solution of 37.4 g of an acrylonitrile/butadiene copolymer, produced by emulsion polymerisation, having an acrylonitrile content of 34.9%, by weight, and a Mooney viscosity ML 1+4 (100° C.) of 29 ME in 337 g of acetone and 3.74 g of hydrogenation catalyst (5% by weight Pd on $CaCO_3$, type K-0207, Heraeus, oxidic form, specific surface area about 15 $m^2/g$, noble metal surface area about 3 $m^2/g$, catalyst particle diameter ($\leq$150 $\mu$m)) is placed in a 0.7 l autoclave. The autoclave is purged several times with nitrogen. Heating is carried out to 50° C., a hydrogen pressure of 50 bar is applied and hydrogenation takes place for 4 hours. The catalyst is then centrifuged off. The degree of hydrogenation is 98.5%.

EXAMPLE 2

Example 1 is repeated using 7.48 g of catalyst, 5% by weight Pd on $CaCO_3$, oxidic form, specific surface area about 10 $m^2/g$, catalyst particle diameter <31 $\mu$m (type E 406 N/D, Degussa). The degree of hydrogenation is 99.1%.

EXAMPLE 3

Example 2 is repeated using 3.74 g of catalyst and an acrylonitrile/butadiene copolymer having an acrylonitrile content of 39.9%, by weight, and a Mooney viscosity ML 1+4 (100° C.) of 46 ME. The degree of hydrogenation is 98.8%.

EXAMPLE 4

Example 3 is repeated using an acrylonitrile/butadiene copolymer having an acrylonitrile content of 28.1%, by weight, and a Mooney viscosity ML 1+4 (100° C.) of 45ME. The degree of hydrogenation is 93.4%.

EXAMPLE 5

Example 1 is repeated using 1.87 g of catalyst at a hydrogen pressure of 150 bar. The degree of hydrogenation is 94%.

EXAMPLE 6

Example 1 is repeated using 1.87 g of catalyst at 35° C. The degree of hydrogenation is 95%.

EXAMPLE 7

Example 2 is repeated with a solution of 56.1 g of polymer in 318 g of acetone and with 11.22 g of catalyst. The degree of hydrogenation is 90.5%.

EXAMPLE 8

Example 2 is repeated with 1.87 g of catalyst at 60° C. The degree of hydrogenation is 93.2%.

EXAMPLE 9

Example 2 is repeated with 1.87 g of catalyst at a hydrogen pressure of 10 bar. The degree of hydrogenation is 83.3%.

We claim:

1. A process for the selective heterogeneous catalytic hydrogenation of carbon-carbon double bonds without hdyrogenating nitrile groups in copolymers having
   from 50 to 85% by weight of copolymerized units of conjugated diene,
   from 15 to 50% by weight of copolymerized units of monomers selected from the group consisting of acrylonitrile and methacrylonitrile, and
   from 0 to 10% by weight of copolymerized units of other ethylenically unsaturated monomers,
   with a degree of hydrogenation of said double bonds of above 80%, wherein the hydrogenation catalyst is palladium precipitated on an alkaline earth metal carbonate support in a quantity of from 5 to 20,000 ppm of palladium, calculated on the basis of the copolymer to be hydrogenated, with a palladium/support ratio of (0.01 to 20):100.

2. A process according to claim 1, wherein the specific surface area (BET) of the catalyst is less than 100 $m^2/g$.

3. A process according to claim 1, wherein calcium carbonate is used as alkaline earth metal carbonate.

4. A process according to claim 1, wherein both the unsaturated and the partially or completely hydrogenated polymers are soluble in the solvent used.

5. A process according to claim 1, wherein the polymer consists of butadiene and acrylonitrile and has a molecular weight of from 500 to 500,000 g/mol (number average).

6. A process according to claim 1, wherein the degree of hydrogenation is at least 90%.

7. A process according to claim 1, comprising performing the hydrogenation at from 0° to 200° C. and a hydrogen pressure of from 1 to 350 bar.

* * * * *